Sept. 30, 1958 K. DANIEL 2,853,923
COMBINED APPARATUS FOR THE REPRODUCTION OF SOUND
AND SIMULTANEOUS PROJECTION OF PICTURES
Filed Feb. 17, 1956 4 Sheets-Sheet 1
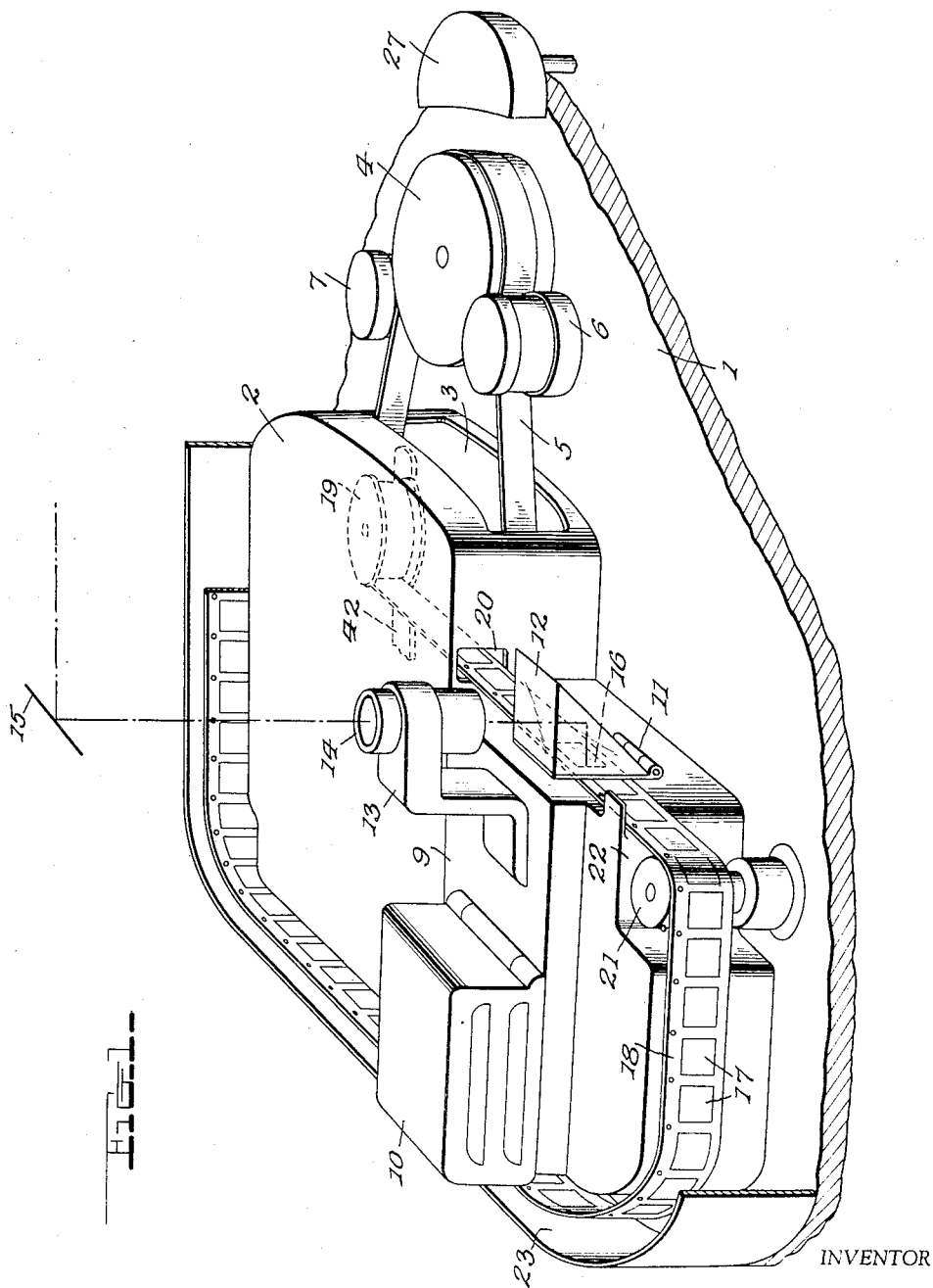
INVENTOR
Karl Daniel
BY
ATTORNEYS

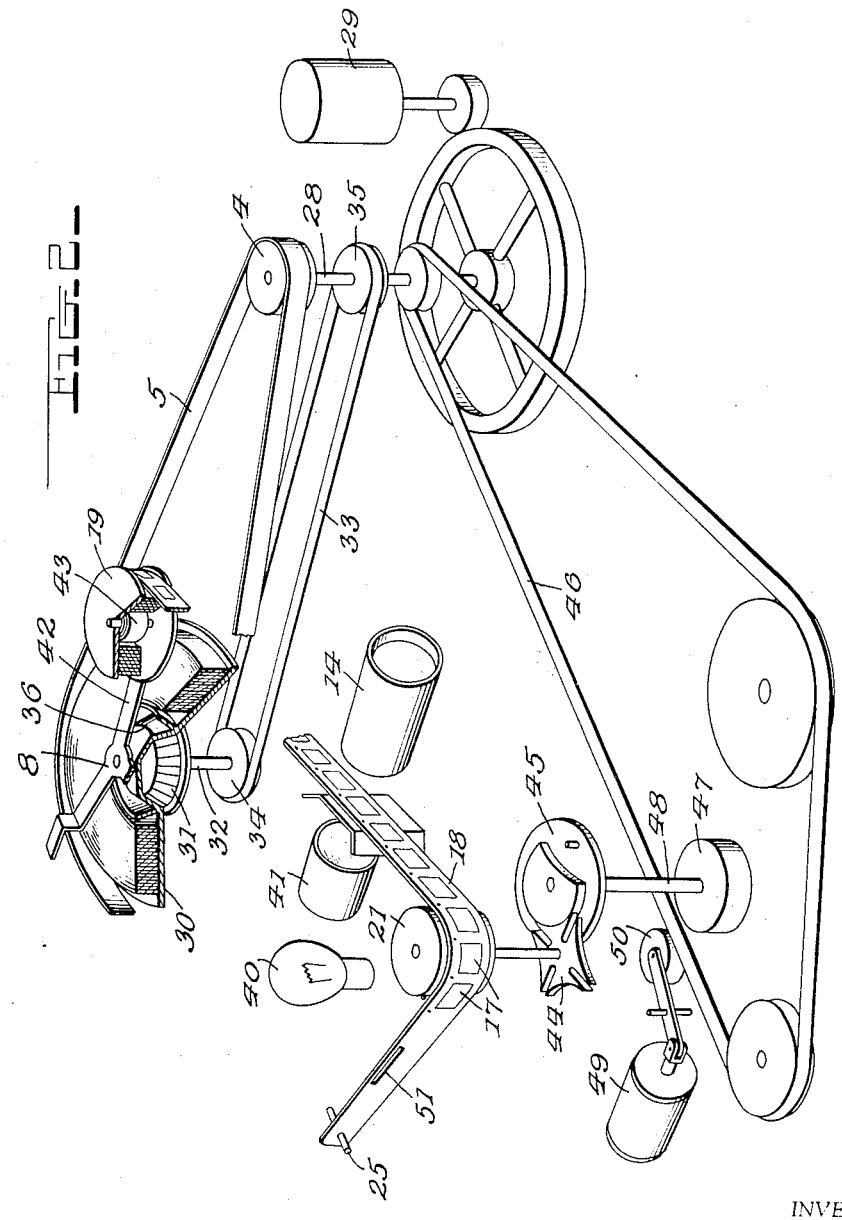

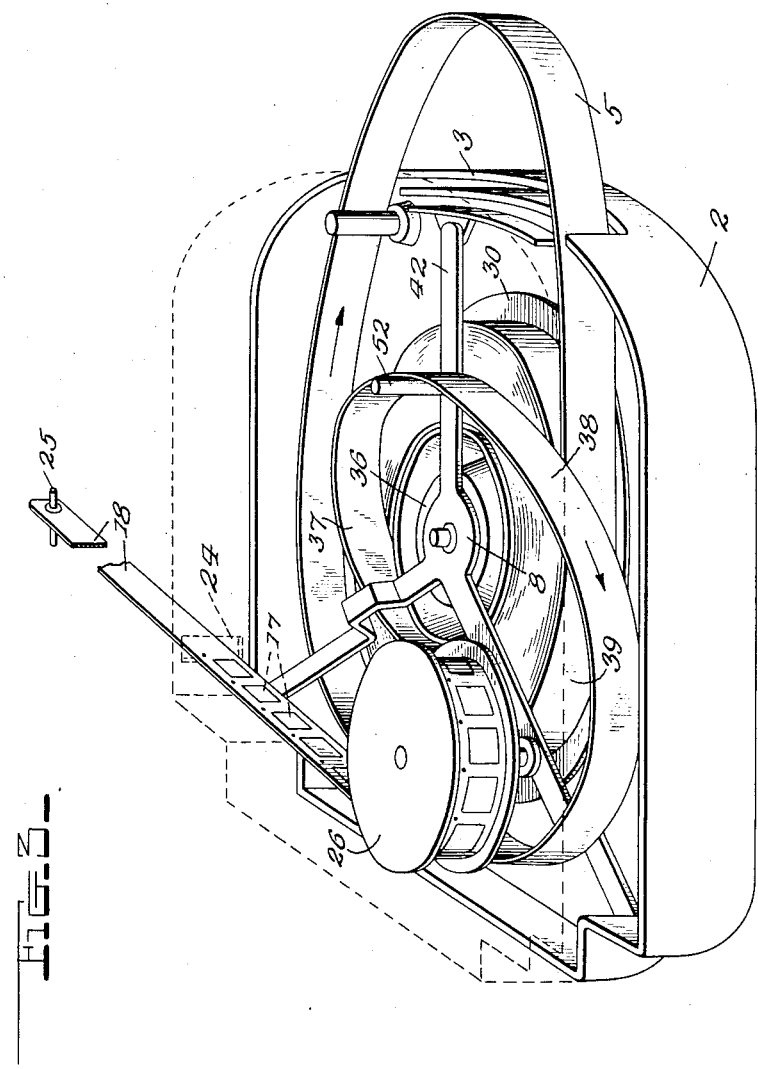

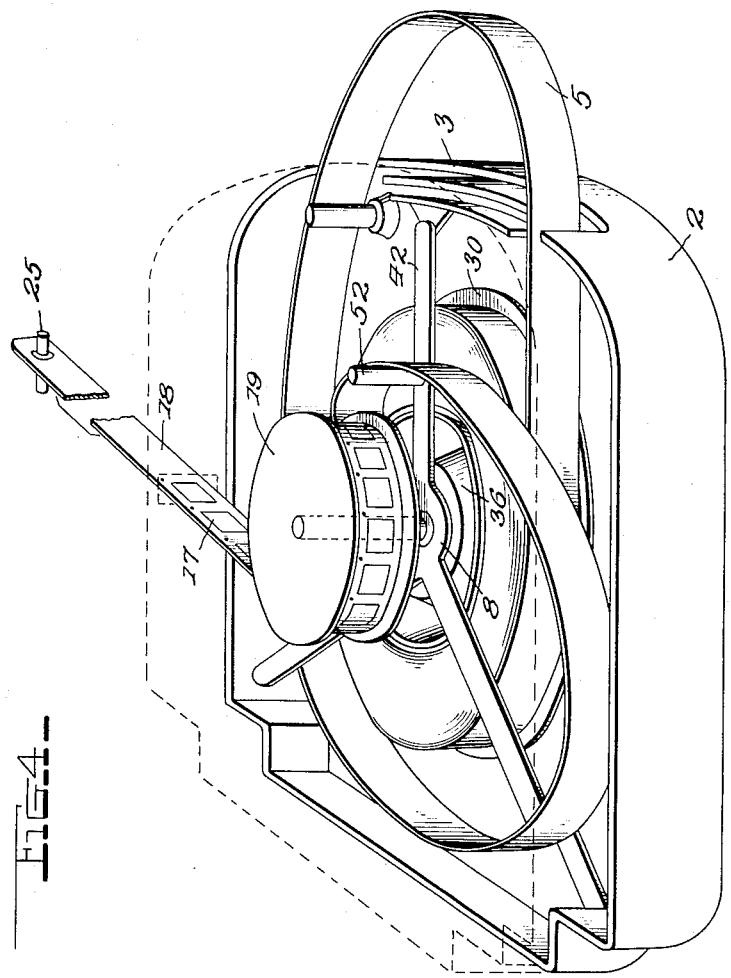

United States Patent Office 2,853,923
Patented Sept. 30, 1958

2,853,923

COMBINED APPARATUS FOR THE REPRODUCTION OF SOUND AND SIMULTANEOUS PROJECTION OF PICTURES

Karl Daniel, Porz, near Koln, Germany

Application February 17, 1956, Serial No. 566,322

Claims priority, application Germany August 8, 1951

5 Claims. (Cl. 88—28)

The invention to which the following description relates is a combined apparatus for the reproduction of sound from an endless tape sound band and simultaneous projection of pictures from a film strip.

Sound reproduction apparatus for encased tape or wirelike sound carriers are known. Picture projectors for still pictures which are on a strip of film are also known. It is furthermore known to enhance still pictures projected by a picture projector by means of sound in that simultaneously with the consecutive projection of a series of still pictures such for example as a strip of film, a sound carrier appropriate to the subject of the pictures is played by a reproduction apparatus for tape or wire sound carriers. Difficulties however frequently arise in that the storage of the films containing the still pictures is carried out independent of the storage of the sound tapes which are associated with them. The tapes and films which are related to each other must then always first be sought or collected which, in the absence of a first class filing system, generally wastes much time.

The purpose of the invention is to overcome this disadvantage. This is achieved by a reproduction apparatus for encased tape or wirelike sound carriers combined with an attached, installed or incorporated picture projector for the still pictures on a strip of film in which the feeding of the film strip is taken from the drive of the sound apparatus and the film strip is irremovably carried by the sound tape container.

Such a combined device is of particular importance if its sound part is fed from a container, which contains an endless tapelike sound carrier rolled into a coil, for example of mechanically or magnetically operated sound carrier tape which is provided with a soundtrack, which consists of several interconnecting sound grooves running parallel or almost parallel to the edge of the tape. Such containers, which to some extent form a part of the sound reproducing apparatus, are placed on a container table provided therein for putting the apparatus into operation, and the tape loop of the tape coil is pulled out from an opening of the container which is otherwise closed on all sides and placed around a guide roller serving as the pick-up position for the tape.

The invention particularly provides with a sound section of the combined apparatus made in such a manner, that the picture projector is fitted next to the container table and indeed with the picture window at the level of the sidewall of the sound carrier container when it is on the table with the film strip which issues from an opening of this sidewall, stored in the container. The feed mechanism for the film strip is preferably adapted to free wheel and it is controlled by a relay for a single feed movement at a time.

The important part of the combination apparatus is the sound carrier container, which according to the invention, by the inclusion of a film strip, becomes at the same time a film strip container. The two tapes which are related to each other as regards their contents, i. e., the film strip and the sound tape, therefore lie always in one and the same container, and the individual tapes need therefore never be sought for separately and brought together, but are always ready at hand in one and the same container, so arranged, that at no time—not even during their showing—do they entirely leave it.

According to the invention, the film strip is mounted in the container containing the endless tapelike sound carrier rolled up into a coil, in a place from which its withdrawal through an opening in one of the sidewalls of the container is possible without being impeded by the loop of the sound tape, and it is indeed preferable, to mount the film strip in the form of a coil in the upper half of the container space containing the reel of sound tape, preferably in the section surrounded by the sound tape loop.

The film strip coil can for example, be mounted above the soundtape coil and concentric therewith, whereby the film strip leaves the container through the sidewall, which adjoins the emerging strip of the soundtape loop. According to a preferred embodiment however in sound tape containers, which are provided with a spider mounted in the container above the coil which prevents the rising of the sound tape coil, the spool of film strip is mounted on one of the arms of this spider.

The invention further provides that the film strip spool is placed under the influence of the restoring force of a spiral spring, which is provided with a locking member, and the film strip is provided at its free end with a stopper which engages the passageway in the container to prevent its entire withdrawal into the container. The perforations of the film strip after the last picture either have widened holes, so that the sprocket operating the feed of the film strip is unable to move the film strip from this position on or the perforations from the said position onwards are completely omitted.

A combination apparatus according to the invention is shown diagrammatically in the drawing by way of example, to the extent which is necessary for a better understanding of the invention, in which Figure 1 is a perspective view of the combined apparatus including the picture film and sound parts within the cabinet;

Figure 2 is a similar view of the same apparatus with the cover of the cabinet broken away to show the operation of the film and the sound bands;

Figure 3 is another perspective view of the bands in operation and

Figure 4 is a modified form of the same.

The sound part of the apparatus is formed by a known sound tape apparatus, of which only a part of the upper cover plate 1 is shown in Figure 1 and which forms the supporting table for the container 2, in front of whose opening 3 a guide roller 4 is fitted for the endless sound tape 5 drawn out from the container. Two pressure rollers 6 and 7 are provided which, if the tapeloop 5 is placed around the guide roller 4, are brought forward onto the periphery of this roller 4, so that the tape 5 lies against the greatest possible part of the circumference of the roller 4. A pick-up sound-head 27 is brought to bear against the tape which runs around the roller 4, and serves either mechanically or magnetically to pick up the sound-recording from the tape 5.

The guide roller 4 is mounted on a shaft 28 projecting through the table loop 1, and is driven by a motor 29, mounted underneath the table. The same motor drives a turntable 30 mounted in the container, upon which the coiled part of the endless sound tape 5, rests. The bottom of the container is provided with an aperture, through which protrudes a shaft 32 which extends upwardly through the table 1 and carries at its free end half member 31 of a coupling. The shaft 32 is driven by the motor of the apparatus by means of a pulley 34 on shaft 32, a pulley 35 on shaft 28 and a connecting belt 33. The other half member 36 of the coupling is mounted on the tape turntable 30. By placing the container on the table 1, both halves of the coupling are brought into engagement with each other.

The tape 5 rises up from the inside of the container, crosses the coil (see Figure 3) and after running around the guide roller 4 winds up again on the outside of the coil. Above the coil is a three-armed spider 8, mounted on small pins (not shown) which project upwardly from the bottom of the container. The arms of the spider prevent the coil from rising up during the rotation in the container and serve as guides for the tape loop. The forward arm of the spider has an upstanding post 52 around which the tape is led.

A small picture projector is fixedly mounted on the table top alongside the container 2. This includes a lamp 40 which is fitted in the housing 9 underneath the hinged cover 10, condenser 41 also mounted in the housing, a total-reflecting prism 12 hinged to the outside of the housing at 11, lens 14 carried by an arm 13 of the housing 9 and a reflecting mirror 15. Behind the prism 12 in the sidewall of the housing 9 is a picture window 16 past which the film strip 18 carrying the individual picture stills 17 to be projected is moved intermittently. The film strip 18 is wound up onto a spool 19 rotatably mounted in the container 2 and as shown in Figure 1 mounted on the arm of the spider 8 adjacent the container aperture 3. The spool 19 obtains sufficient returning force from a coil-spring 43 to cause the strip, when it has been almost entirely withdrawn from the container, i. e., when all the pictures have been projected, to wind up again inside the container. The spool of the very narrow strip lies entirely in the upper half of the sound tape container and the strip leaves the container through a window 20 in the upper half of its sidewall. From this window the strip passes between the sidewall of the housing 9 of the picture projector and moves past the prism 12 and past the picture window 16 to a sprocket 21, which is housed in a recess 22 of the housing 9. From the sprocket 21 the strip is led into a small channel, which is provided between the housing 9 of the picture projector and an upstanding ridge 23 of the table 1. The transfer of the strip from picture to picture is effected by the sprocket in conjunction with a Maltese cross gear 44, whose rotating disc 45 with fixed stud makes one turn through electrical control each time. When the film strip except for the attached end, has been fully withdrawn from the spool 19, the increased tension of the spring 43 will rewind the strip whenever it is released manually from the sprocket 21.

The drive of the sprocket is effected by the drive of the sound apparatus undereneath the table 1 by means of a rubber belt 46 or a friction wheel drive. The belt 46 rotates continuously near a pulley 47 at the lower end of a shaft 48 on which the disc 45 is mounted. The belt 46 is brought into driving engagement with pulley 47 by means of a pivoted idler 50 actuated by the solenoid 49 actuated in synchronism with the feed of the sound carrier tape.

The transport of the band, picture for picture, is through sprocket 21 operated by the Maltese cross 44, when a pin by electrical impulse is set in operation turning the picture band 18 advancing a picture. Movement of the disc 45 is caused by the sound apparatus likewise under cover plate 1 and by means of a belt 46. The arrangement is such that the belt 46 normally is not in engagement with the disc 47 on the shaft 48 and the disc 45. If the picture band 18 is to advance a picture, the belt 46, in the allotted time will be made to contact the disk 47. This is done by means of a relay 49, which likewise is timed together with sound band 5, to synchronize sound and picture, etc. To accomplish this a well known regulating means may be provided outside the scope of audible vibrations of sound to function during the passing of appropriately spaced portions of the sound band 5. When the relay 49 is actuated by the controlling means, then it presses the tread of the idler roll 50 against the belt 46 and the latter against the disk 47, so that this starts turning. When the pick-up action of the controlling means has been completed, the action of the relay 49 is stopped, the sprocket 21 stands still after having forwarded the picture band to obtain a new picture. The constantly moving sound band 5 by aid of sound head 27 supplies the sound for the new picture appearing at picture window 16.

The light projected by the lamp in the picture projection housing 9 passes through the condenser similarly mounted in the picture projection housing to the picture window 16, through the film 18, the prism 12 and the lens 14 to the reflecting mirror 15, which either reflects it onto a frosted glass plate mounted on the opposite wall of the sound apparatus or projects it onto a picture screen.

During the movement of the film strip the tapelike sound carrier mounted in the same container is played. This sound-tape has a sound track appropriate to the pictorial content of the film strip.

In the embodiment by way of example of Figure 1, the film strip spool 19 is rotatably mounted on the forward arm of the spider 8 which prevents the sound tape roll from rising up in the container 2. A coil spring 43 is used to retract the film strip on the spool after use.

As shown in Figure 3, the sound band 5 is drawn from the coil at 37, crosses the coil at 38, travels completely around the coil to form the loop 5, after which it is wound up on the outside of the coil as at 39.

As shown by way of example in Figures 1 and 2, the picture band spool is placed on the front arm 42 of the bridge 8. The picture band spool may also be placed immediately over the sound band roll in the cassette, as indicated in Figure 4. In this case the picture band does not leave the cassette through the sidewall opening marked on Figure 1 as 20, but through the opposite sidewall of the cassette and in a place where it will not block the sprocket 21 with its sound band roll. Consequently the picture projector is also opposite the sound band-picture band cassette 2.

Figure 3 shows an arrangement of the film strip spool 26 on one of the rear arms of the spider 8, i. e., on one of those arms of this spider, which are directed away from the exit opening for the sound tape loop. Here the film strip spool 26 lies above the sound tape coil in the space bounded by the sound tape loop. The film strip in this case leaves the container through the opening 24 of the sidewall of the container, and naturally the picture projector is mounted next to this opening. The film strip spool is also here again under the influence of a spiral spring similar to 43, which has the function of rewinding the film strip upon the spool. In order to avoid the film strip being retracted entirely through, it is necessary to provide the end of the strip with a stop element, which cannot pass the container opening 24. In the embodiment by way of example shown on Figure 3, this stop element consists of a pin 25 extending laterally through the film strip. Further, in order to ensure that after the projection of the last picture, further rotations of the sprocket of the picture apparatus do not tear away the film which is anchored at the core of the film strip spool, the perforations of the film strip after the last picture are so formed by widening the holes to slits, so that the sprocket can no longer feed the film.

The function of the enlarged perforations or slits is better understood if one pictures the band as running backwards, that is, the band is being wound onto the spool 19 after having been completely off the spool in the beginning of its run. In this case naturally the enlarged perforations must be near the free end of the picture band as shown at 51 in Figure 2. When this enlarged perforation comes close to the teeth of sprocket 21, the band will be carried no further, leaving the picture band at a stand-still.

It is important for the mounting of the film strip spool in the sound tape container, that the sound tape rolled up into a coil leaves the actual coil rising up at an inclined angle, in order after rising over the coil in a wide loop to come down again to the level of the coil. This tape feed requires that the height of the container enclosing the sound tape is at least twice the width of the sound tape. This full clearance is however only needed at the position of the steeply rising part of the tape, so that the sound tape container, particularly within the widely extended sound tape loop, has an unused part within which, according to the invention, the small film strip spool is mounted. In the embodiment shown by way of example it has been assumed for the sake of simplicity, that the width of the film strip is approximately equal to the width of the sound tape. However, the invention also includes the possibility for purposes of obtaining a larger size picture, of making the sound tape narrower and making the film strip wider by the same amount. Even in such cases the height of the container remains unchanged.

The present application is a continuation-in-part of applicant's prior application filed August 5, 1952, Ser. No. 302,848 and now abandoned.

What I claim is:

1. A combined apparatus for simultaneously reproducing sound and projecting related images of still pictures comprising a supporting platform, a common container thereon, a reel in the container for holding an endless sound record band, a constantly rotating roller on the platform outside the container to receive a loop of said band, a spider supported in the container over the reel in guiding relation to said loop, a spool revolubly mounted on said spider to carry a pictorial film strip, a sprocket for the film strip, intermittently operated rotating means for said sprocket, a picture projector in the path of the strip from the spool to the sprocket, and a common motor continuously actuating the band roller means intermittently connecting the motor to the sprocket operating means.

2. An apparatus as defined in claim 1 in which the film spool is provided with a film retracting spring.

3. An apparatus as defined in claim 1 in which the container has a narrow passageway for the withdrawal of the film, the spool is provided with a film retracting spring and the free end of the film has a stopper engaging the said passageway on retraction.

4. An apparatus as defined in claim 1 in which the sprocket rotating means is operated at the will of the operator.

5. An apparatus as defined in claim 1 in which the film spool is mounted eccentrically on the spider.

References Cited in the file of this patent

UNITED STATES PATENTS

| | | |
|---|---|---|
| 2,008,881 | Thomas | July 23, 1935 |
| 2,426,838 | Miller | Sept. 2, 1947 |